United States Patent [19]

Swirbel

[11] Patent Number: 5,515,191
[45] Date of Patent: May 7, 1996

[54] LIQUID CRYSTAL DISPLAY HAVING ENHANCED CONDUCTORS AND ADHESIVE SPACERS

[75] Inventor: Thomas J. Swirbel, Davie, Fla.

[73] Assignee: Motorola, Inc., Schaumburg, Ill.

[21] Appl. No.: 251,446

[22] Filed: May 31, 1994

[51] Int. Cl.⁶ .................. G02F 1/1339; G02F 1/1343
[52] U.S. Cl. .................. 359/81; 359/54; 359/87
[58] Field of Search .................. 359/80, 81, 87, 359/54, 75, 78

[56] References Cited

U.S. PATENT DOCUMENTS

| | | | |
|---|---|---|---|
| 3,863,332 | 2/1975 | Leupp et al. | 359/81 |
| 3,909,930 | 10/1975 | Gurtler | 29/592 |
| 3,952,405 | 4/1976 | Vest | 359/81 |
| 4,401,537 | 8/1983 | Chern et al. | 359/80 |
| 4,422,731 | 12/1983 | Droguet et al. | 359/81 |
| 4,543,573 | 9/1985 | Fuyama et al. | 359/87 |
| 4,568,149 | 2/1986 | Sugata et al. | 359/81 |
| 4,653,864 | 3/1987 | Baron et al. | 359/81 |
| 4,725,517 | 2/1988 | Nakanowatari et al. | 359/81 |
| 4,728,176 | 3/1988 | Tsuboyama et al. | 359/81 |
| 5,089,905 | 2/1992 | Sasaki et al. | 359/81 |
| 5,124,816 | 6/1992 | Yoshihara et al. | 359/87 |
| 5,379,139 | 1/1995 | Sato et al. | 359/80 |

FOREIGN PATENT DOCUMENTS 60-182414  9/1985  Japan.

*Primary Examiner*—William L. Sikes
*Assistant Examiner*—Tai V. Duong
*Attorney, Agent, or Firm*—Dale W. Dorinski

[57] ABSTRACT

Briefly, according to the invention, there is provided a liquid crystal display device (LCD). The LCD has an electrode pattern (14) deposited on one side of a substrate (10). The pattern is formed in a series of elements or pixels (13), that are arranged in a regularly ordered matrix of rows and columns. Metal conductors (16) are also on the face of the substrate and are electrically connected to the electrode elements. A spacer material (27) is formed on metal conductors and a second substrate (10') is placed on the first substrate, and the two substrates are arranged so that a uniform gap (25) is maintained between the substrates by the spacer material. A liquid crystal material (29) is then disposed in the uniform gap. The spacer material can be a photoimaged adhesive, the electrode pattern can be indium/tin oxide, the metal conductors can be copper, and the metal conductors are located between the rows and columns of the plurality of elements in the electrode pattern.

2 Claims, 3 Drawing Sheets

LIQUID CRYSTAL DISPLAY HAVING ENHANCED CONDUCTORS AND ADHESIVE SPACERS

TECHNICAL FIELD

This invention relates in general to liquid crystal display devices and more particularly to liquid crystal display devices having highly conductive circuitry.

BACKGROUND

Liquid crystal display (LCD) devices contain a liquid crystal material located between a pair of electrodes facing each other. Information written to the display is imaged by creating optical changes in the liquid crystal material by applying a voltage to selected portions of the electrodes.

Conventional LCDs typically use transparent conductive films, such as indium/tin oxide (ITO) for the electrodes. The sheet resistivity of these transparent films used for twisted nematic (TN) and super twisted nematic (STN) displays is typically about 100 Ohms per square. For active matrix displays with video graphic capability, sheet resistivity of less then 10 Ohms per square is required and a resistivity of less than 1 Ohm per square is preferred. When glass or quartz is used as a display substrate material, current techniques require that the substrate be elevated above 300° C. to optimize the film's crystal structure and, thus, the oxide state, in order to attain the specific resistance of $1\times10(-4)$ Ohm-cm. Still, even when using this technique, film thicknesses on the order of 10,000 Ångstroms (1 micron) are needed in order to achieve a sheet resistivity of 1 Ohm per square. At these thicknesses, the tradeoff between conductivity and transparency becomes a concern, because the transparency is now less than 75%, which affects the contrast of the LCDs. Also, the increased thickness needed in order to achieve the high conductivity electrode film begins to have an effect on the gap in the LCD. With gap sizes becoming smaller and smaller and now currently approaching four microns, a metal thickness of greater than one micron on each of the two substrates begins to have a significant effect on the resultant gap of the finished display. Clearly, further reductions in gap size will not be attainable with the current state of technology. Larger displays having even more pixels will require even lower conductivity, thus, thicker electrode material. In addition, the decrease in transparency and reduced contrast due to this thick electrode material now begins to take its toll. Further, the need to use a high-temperature processing step to attain films with acceptable conductivity limits the type of substrate materials which can be used to manufacture displays. For example, it requires that a material such as glass or quartz be used, as opposed to cheaper and lower melting materials such as plastic.

As the size of the LCD increases, the glass is subject to sagging in the center, and also becomes expensive. In order to eliminate these shortcomings, the glass substrates have been replaced with a polymer or plastic substrate which is flexible, light, strong, and more easily formed into shapes. However, when sealing these types of displays with conventional adhesives, epoxies for example, insufficient sealing or adhesion to the polymer is noticed. The use of spherical spacers to maintain the gap is problematical, and as the size of the display increases or as the gap between the electrodes decreases, the requirements placed on the spherical spacers become more and more stringent. Also, in the case of large LCDs, for example greater than 50 mm×50 mm, deflection at the center of the plastic display is far worse than in glass displays because of the non-rigid nature of the plastic substrates. Even with the spherical spacers, it is difficult to continually maintain an accurate gap.

Clearly, it would be a desirable improvement if an LCD could be created that utilizes lower cost substrates, such as plastic, on very large displays, and could maintain an extremely uniform and extremely small gap between the two substrates. In addition, it would also be desirable if the electrode pattern could have increased conductivity.

SUMMARY OF THE INVENTION

Briefly, according to the invention, there is provided a liquid crystal display device (LCD). The LCD has an electrode pattern deposited on one side of a substrate. The pattern is formed in a series of elements or pixels, that are arranged in a regularly ordered matrix of rows and columns. Metal conductors are also. on the face of the substrate and are electrically connected to the electrode elements. A spacer material is formed on the metal conductors and a second substrate is placed on the first substrate. The two substrates are arranged so that a uniform gap is maintained between the substrates by the spacer material. A liquid crystal material is then disposed in the uniform gap.

In alternate embodiments of the invention, the spacer material is a photoimaged adhesive. In another embodiment, the electrode pattern is indium/tin oxide (ITO). Still another embodiment finds that the metal conductors are copper. A further embodiment shows the metal conductors located between the rows and columns of the plurality of elements in the electrode pattern.

DETAILED DESCRIPTION OF THE PREFERRED EMBODIMENT

Figure 1:
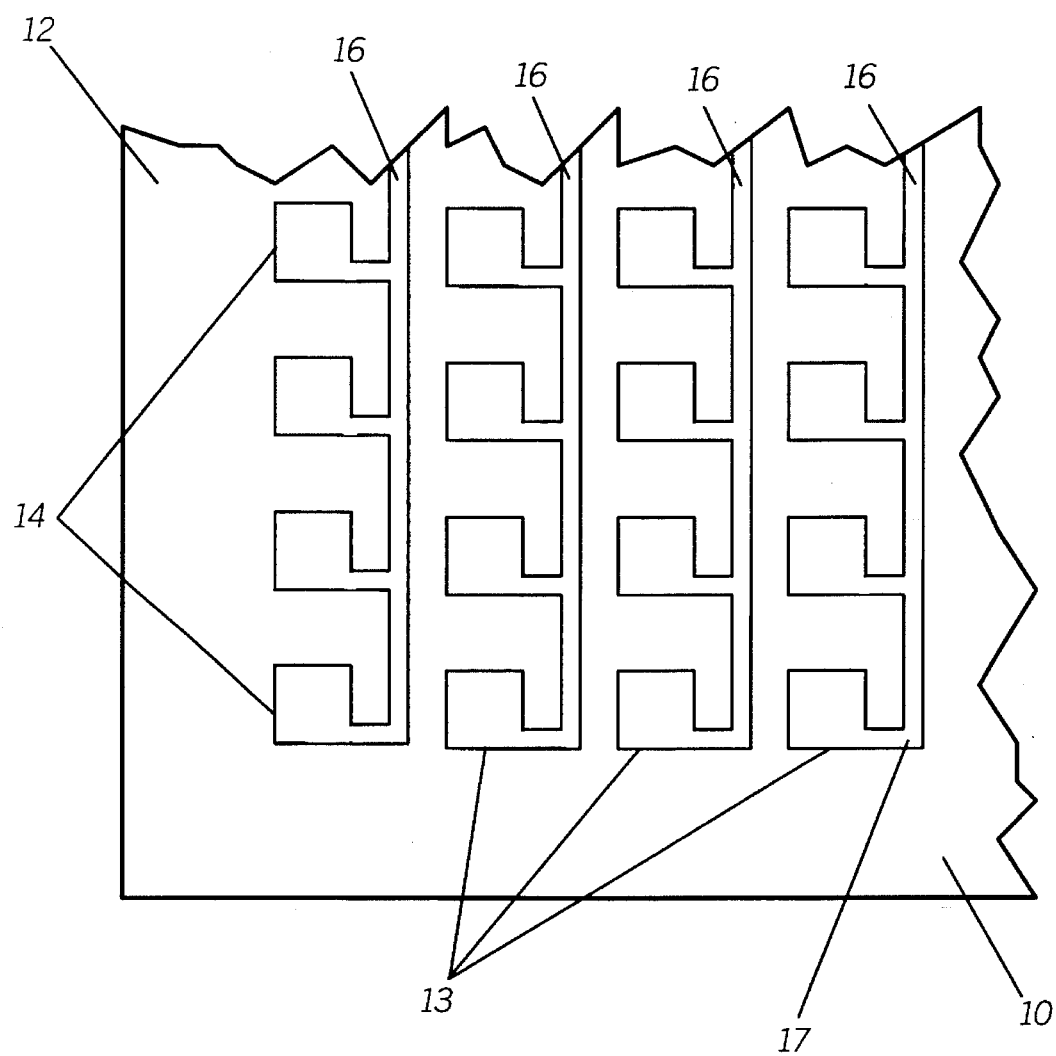
FIG. 1 is a plan view of a portion of a liquid crystal display (LCD) substrate showing the electrode pattern and metal conductors in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a substrate 10 of an insulated material, such as glass, quartz, or plastic, is provided. On one side or surface 12 of the substrate 10, a plurality of electrodes 14 is formed or deposited by well-known techniques, such as sputtering. The electrodes are typically composed of indium oxide or indium/tin oxide. The electrodes 14 are arranged on the surface 12 of the substrate 10 in a predetermined pattern, herein shown as a series or matrix of elements arranged in rows and columns. The electrodes, however, can be arranged in other suitable patterns if desired and may take other shapes, such as circles, triangles, or other regular or irregular polygons. In the preferred embodiment of the present invention, these electrodes are arranged in the row and column format to create a series of pixels on the LCD.

Figure 2:
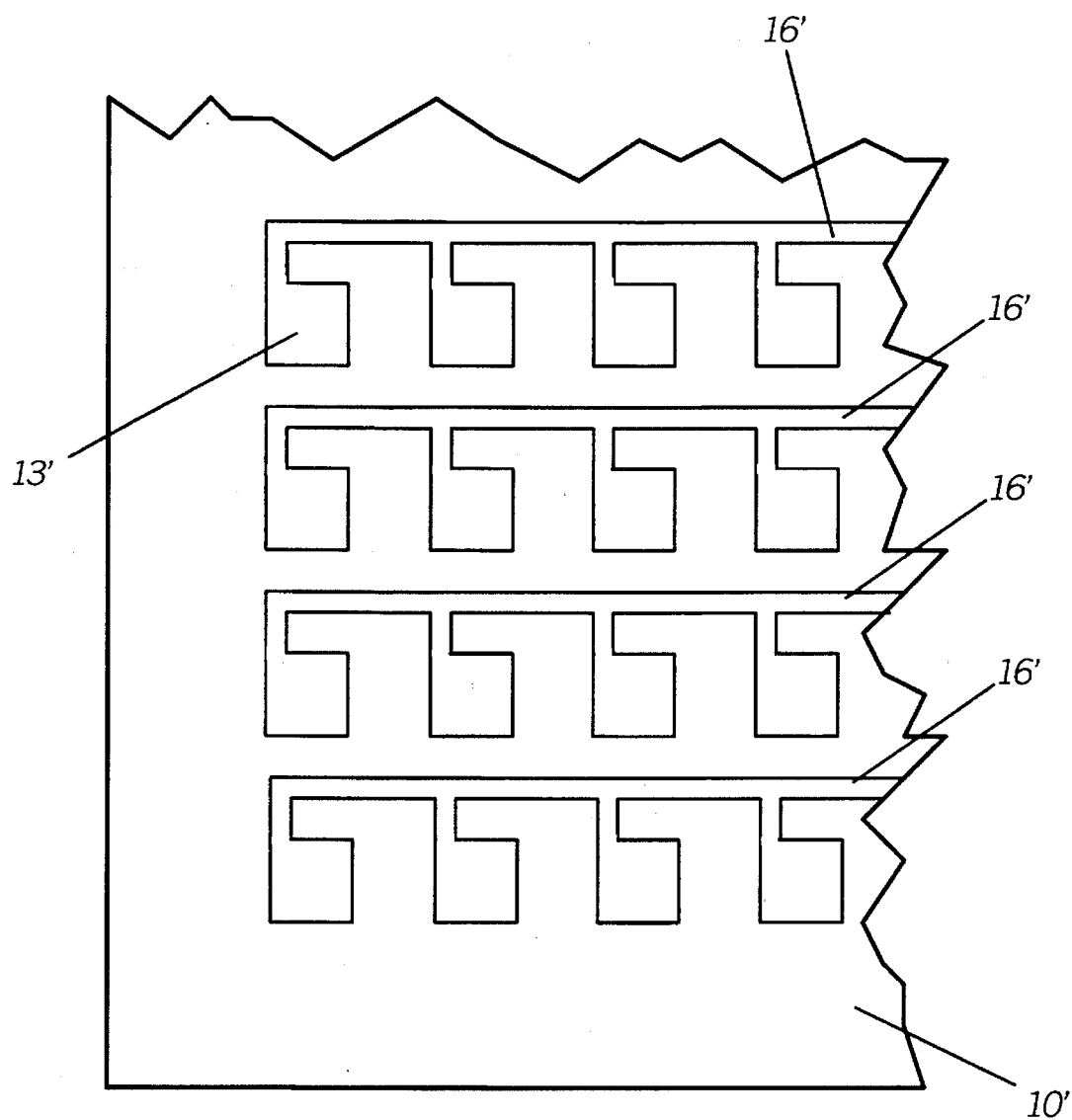
FIG. 2 is another example of a patterned substrate in accordance with the present invention.

Also deposited or formed on the same side 12 of the substrate 10 is a series of metal conductors that are physically and electrically connected to some of the individual elements in the electrode patterns 14. In the preferred embodiment, conductors 16 are a metal, such as copper, but other metals may be substituted and still provide a useful end product; for example, aluminum, chrome, nickel, titanium, or other metals commonly sputtered that have relatively high conductivity, may be substituted for the copper. Each of the conductors 16 has a portion 17 that is connected to one of the individual elements 13 of the electrode pattern 14. In the preferred embodiment, the conductors 16 are connected in parallel to an entire column of the elements 13. Another substrate, as shown in FIG. 2, may connect the conductors 16' to an entire row of elements 13'. In both FIGS. 1 and 2, the metal conductors are replicated across the surface of the substrate 10 in order to interconnect rows or columns of the individual elements 13 of the electrode patterns 14. The figures also show that the conductors 16 are formed in the space between the rows and columns of the individual elements.

Figure 3:
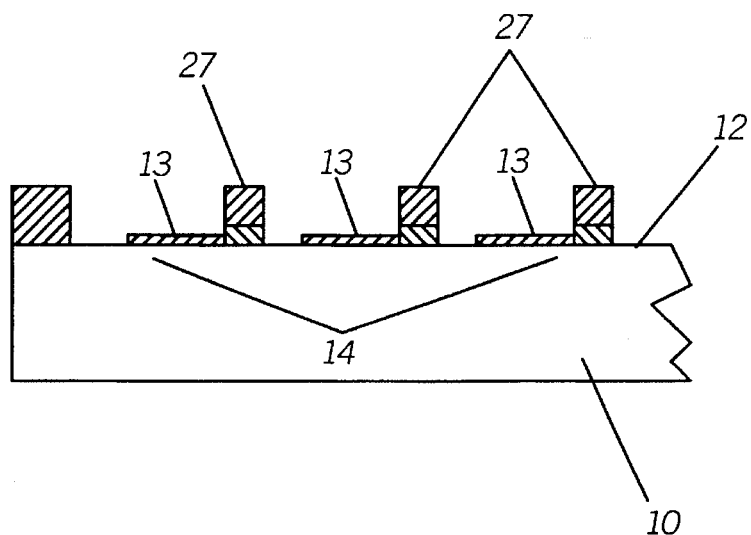
FIG. 3 is a cross-sectional view of a substrate having metal conductors and a spacer material in accordance with the present invention.

Referring now to FIG. 3, an electrically insulative material 27 is formed on top of the metal conductors 16. The electrically insulated material 27 serves as a spacer and may be formed from any number of materials and by a number of techniques. However, the preferred technique is to use a photoimagable adhesive that is deposited across the entire substrate and photoimaged and developed in order to create the desired pattern. Selected adhesives and methods of patterning them may be found in U.S. patent application Ser. No. 08/069,798 by Williams, et al., filed on Jun. 1, 1993, and assigned to Motorola, Inc., which is incorporated herein by reference. While various types of spacer materials may be used, a photoimagable adhesive provides the preferred embodiment. The photoimaged adhesive serves to not only maintain the gap between the substrates, it also aids in bonding the two substrates together.

Figure 4:
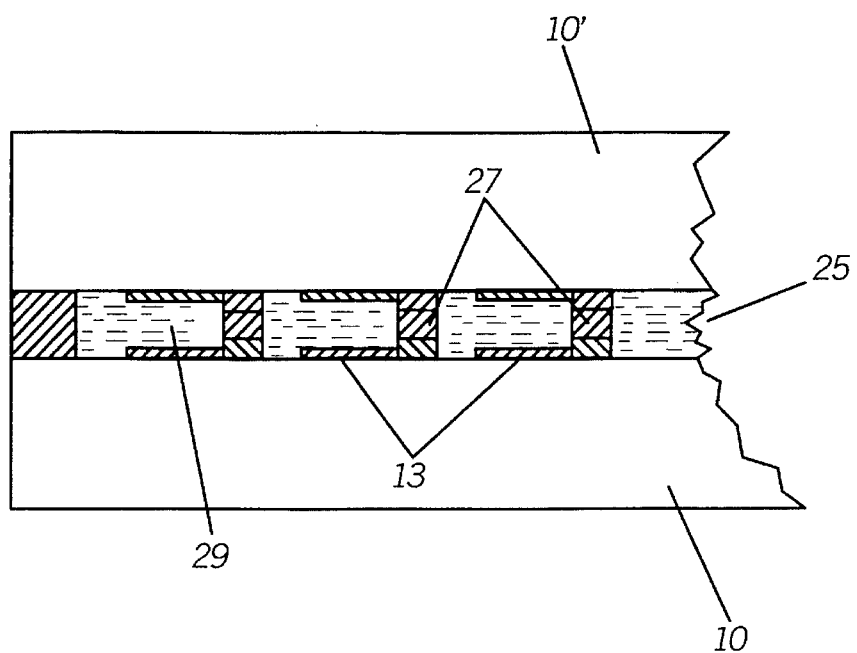
FIG. 4 is a cross-sectional view of an LCD assembled in accordance with the invention.

Referring now to FIG. 4, the second substrate 10', as described in FIG. 2, is now bonded to the first substrate 10 by the photoimaged adhesive 27. The gap 25 formed between the two substrates 10 and 10' is maintained by the photoimaged adhesive 27, and the two substrates 10 and 10' are held in alignment and in proper position by the photoimaged adhesive 27. A liquid crystal material 29 is disposed in the gap 25 between the two substrates.

In alternate embodiments of the invention, only one substrate has the copper conductors, or metal conductors, 16 formed thereon. The second substrate is bonded directly to the spacer material or photoimaged adhesive 27.

The layer of photoimaged adhesive or spacer material is of a predetermined thickness. This thickness is required in order to properly space the electrode pattern 14 on the substrate 10 of the LCD from those on a second substrate 10'. The formation of the photoimaged adhesive can be accomplished by techniques described in the above-referenced patent application. As can be seen in FIG. 3, the electrode pattern 14 is revealed through the openings provided in the spacer material 27.

Methods of bonding the two substrates 10 and 10' together are outlined in U.S. patent application Ser. No. 08/143,952 by Williams, et al., filed on Nov. 1, 1993, now abandoned which is a continuation-in-part application of Ser. No. 08/069,798 filed on Jun. 1, 1993, now U.S. Pat. No. 5,378, 298, both assigned to Motorola, Inc., both incorporated herein by reference. In some applications of LCD technology, an alignment layer of a material such as polyimide, is used. The polyimide alignment layer is typically formed on top of the electrode pattern and the metal conductors. The spacer material 27 may be formed on top of the polyimide alignment layer, or the polyimide alignment layer itself may be used to form a spacer material on top of the metal conductors 16. The improvement gained by creating an LCD with high conductivity metal interconnects is shown in the following example. Assume an LCD 60 cm wide with pixels or electrode elements addressed from each side of the panel, such that from each edge of the panel, the maximum conductor length in any one direction is 30 cms. The specific resistivity of copper is $2.2 \times 10^{-6}$ Ohms cms.

$$\text{RESISTANCE} = \text{SPECIFIC RESISTIVITY} \times (\text{LENGTH}/\{D\}\{W\})$$

For a ten micron wide copper line that is 1000 Ångstroms thick, the resistance is approximately 660 Ohms. Assume a pixel or element spacing of about 0.5 mm. To achieve this same resistance, a thickness of indium/tin oxide would require approximately 9000 Ångstroms or 1 micron of metal thickness, which is nearly nine times that required for copper. For high-contrast displays, pixel spacings of 0.25 mm are employed and would require an indium/tin oxide thickness approaching 18000 Ångstroms or 2 microns. As can be seen, with display gap sizes approaching four microns, the thickness of ITO becomes extremely significant and becomes a limiting factor in achieving small gap sizes. The 20–25% loss of transparency derived in films of this thickness is also critical. By taking advantage of the space in the display used for spacers and adhesive bonding and forming internal, high-conductivity runners that are buried under the spacer traces, a large area display can be created that more effectively addresses the individual pixel elements.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A liquid crystal display device, comprising:

a first plastic substrate having an indium/tin oxide electrode pattern deposited on a face thereof, the pattern formed in a plurality of elements arranged in a regularly ordered matrix of rows and columns, and having copper, aluminum or chrome conductors thereon, the conductors being situated between the rows or columns and connected to the plurality of elements;

a photoimaged adhesive spacer material deposited on the copper, aluminum or chrome conductors;

a second plastic substrate having an indium/tin oxide electrode pattern deposited on a face thereof, the pattern formed in a plurality of elements arranged in a regularly ordered matrix of rows and columns, and having copper, aluminum or chrome conductors thereon, the conductors being situated between the rows or columns and connected to the plurality of elements;

the first and second substrates adhesively bonded to each other by the photoimaged adhesive spacer material, and arranged so that a uniform gap is maintained between the substrates by the spacer material; and a liquid crystal material disposed in the uniform gap.

2. A liquid crystal display device, comprising:

first and second plastic substrates, each having a transparent electrode pattern adhered to a face thereof, the pattern formed of a plurality of elements arranged in rows and columns, and each substrate having metal conductors adhered to a face thereof, the metal conductors being of substantially greater electrical conductivity than the electrode pattern and situated between the rows or column and connected to the electrode pattern;

a polyimide alignment layer disposed over the transparent electrode pattern and the metal conductors;

a photoimaged adhesive deposited in the area of the metal conductors;

the substrates arranged so that the transparent electrode patterns face each other with the photoimaged adhesive forming a uniform gap between the substrates and adhesively bonding the substrate together;

a liquid crystal material disposed in the uniform gap.

* * * * *